R. CONRAD.
GAGE.
APPLICATION FILED DEC. 29, 1908.
1,225,314.
Patented May 8, 1917.
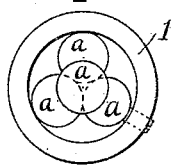
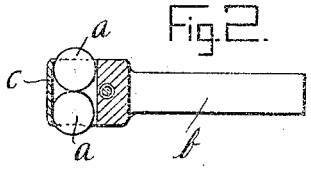
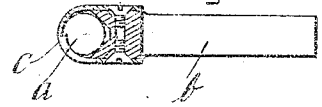
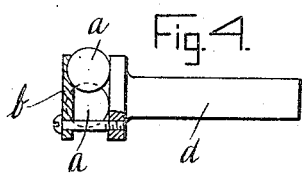
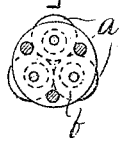
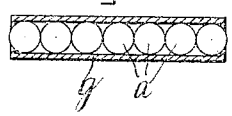
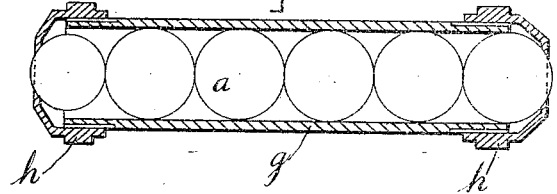
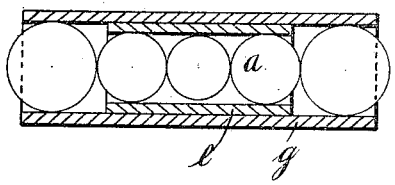
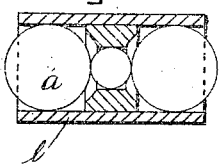
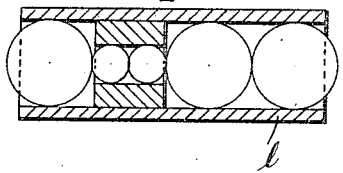
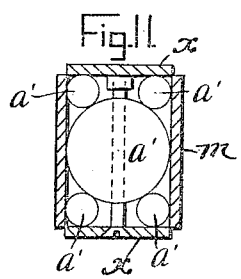
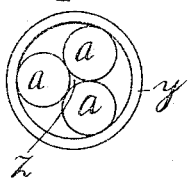
INVENTOR
Robert Conrad
BY
C. W. Fairbank
ATTORNEY

UNITED STATES PATENT OFFICE.

ROBERT CONRAD, OF WEISSENSEE, NEAR BERLIN, GERMANY.

GAGE.

1,225,314.   Specification of Letters Patent.   Patented May 8, 1917.

Application filed December 29, 1908. Serial No. 469,859.

*To all whom it may concern:*

Be it known that I, ROBERT CONRAD, a subject of the Emperor of Germany, residing at Maschinenfabrik, Weissensee, near Berlin, in the Kingdom of Prussia, German Empire, have invented new and useful Improvements in Gages, of which the following is a specification.

My invention relates to instruments for exactly determining distances, sizes, proportions and the like. Such instruments are used in large quantities by most factories in the form of simple gages, slide-gages, end-gages, templets and so on. In such instruments known heretofore the size of the measurement is either ascertained from the known diameter of cylinders, as *e. g.*, in plug-gages, or, as in the case of slide-gages, snap-gages and so on, from the known distance between two parallel planes.

The construction of cylinders with an exactitude of 1/500th to 1/1000th of a millimeter, or even of parallel planes a predetermined distance apart with the same accuracy, is comparatively very difficult and consequently the price of such instruments is very high.

Now a primary object of my invention is to provide such instruments which can be made much cheaper but with the same accuracy as, or still greater accuracy than, those known heretofore.

In contradistinction to the known instruments mentioned above, I make my improved gages by means of spheres. Manufacturers are now able to produce steel balls on exact ball-grinding machines on a large scale with a precision which far exceeds 1/1000th part of a millimeter and, moreover, in gradations as small as desired. Owing to using such balls, the cost of my measuring instruments is a small fraction of the previous price, equal and even greater exactitude being obtained. In addition, the measurements made with my instruments are made more conveniently and with more certainty than heretofore, and the holes which are measured and the gages are not damaged as much as formerly because spheres cannot be placed edgewise.

In my divisional application, Serial No. 775,842, filed June 26th, 1913, I have disclosed and claimed certain forms in which the diameter of a single ball constitutes the determinative measuring distance. Said divisional application also discloses and claims constructions in which two such balls may be connected together and used as the maximum and minimum limit gages for a single piece of work.

In my present application, I have retained and claimed certain forms or embodiments of my invention in which a plurality of balls or spheres are carried by a single handle or holder so that separate surface portions of different balls or spheres are presented for engagement with the work and the determinative measuring distance is from one sphere surface to an opposed sphere surface. This determinative measuring distance is, in the preferred embodiments, the sum of the diameters of two or more spheres, but this is not essential.

In order that my invention may be clearly understood, I will now explain the same with reference to the accompanying drawings in which various embodiments are represented by way of example. In said drawings:

Figure 1 is a top plan view of a part of a gage comprising a pyramid of balls;

Figs. 2 and 3 are horizontal and vertical sections, respectively, of an internal gage comprising two balls;

Figs. 4 and 5 are side elevation, partly in section, and sectional elevation, respectively, showing a form of internal gage comprising three balls;

Fig. 6 is a central longitudinal section of an end gage, the parts being shown somewhat diagrammatically;

Fig. 7 is a central longitudinal section of an improved form of end gage;

Figs. 8, 9 and 10 are similar views showing the use of balls of different sizes;

Fig. 11 is an elevation partly in section showing a parallel end gage; and

Fig. 12 is a plan view of an improved wire gage.

As previously stated, the subject matter of my present application is now restricted to those constructions in which a plurality of balls or spheres are used for the purpose of obtaining a greater width or distance than is convenient by the use of a single ball, or for permitting of an interchange of balls and a variation in the total effective measuring distance, or for permitting of the device being used in places inaccessible to a large ball.

In the accompanying drawings, various forms are illustrated whereby a plurality of balls in a single holder may be made use of to advantage.

Fig. 1 shows a construction in which a pyramid of four balls —a— is held in a ring 1. The distance between the lower surface of the three lower balls and the upper surface of the top ball may constitute the determinative measuring distance between two planes. The balls may be held together in any other suitable manner than that shown and the balls may be interchangeable for balls of different sizes to vary the device for different measuring purposes.

Figs. 2 and 3 show an internal gage comprising two balls —a— held in contact at the end of a holder —b—. This holder retains the two balls in contact and exposes their opposed surfaces so that the determinative measuring distance is the sum of the diameters of the two balls. As shown, the base of the holder has a transverse groove or channel in which the balls are retained by a clamping member —c— of any suitable character.

Figs. 4 and 5 show a somewhat similar construction in which three balls —a— are held in a holder —d— and in contact with each other. As shown, the holder includes a clamping member —f— which is recessed to form sockets for the balls and to hold them with their outer surfaces exposed. Such an instrument is adapted for gaging the internal diameter of circular apertures.

In employing a plurality of balls for an end gage, I preferably mount a series of balls —a— in a tubular holder as shown rather diagrammatically in Fig. 6. The holder is in the form of a sleeve or tube —g— of such length that the two end balls project beyond the corresponding ends of the tube or sleeve.

If preferred, a permanent cap may be employed at one end with an aperture through which the ball may partly protrude and a similar but detachable cap may be provided at the opposite end and also having an aperture through which the adjacent ball may project.

In Fig. 7, I have shown one form in which caps —h— are employed for retaining the balls in position.

In order to be able to readily form gages of different lengths, one or more of the balls may be removed and replaced by slightly larger or smaller balls. With a cap of the character shown in Fig. 7, the aperture in the cap may hold the terminal ball properly centered without contact with the peripheral wall of the tube or sleeve even though said ball be materially smaller than the holder, as is shown particularly at the left hand end of Fig. 7.

In Figs. 8, 9 and 10, I have shown sleeves or tubes —l— which may be inserted in the outer tube or holder —g— for the purpose of properly centering or retaining balls of materially smaller diameter than the main holder. The total effective measuring distance is therefore always exactly equal to the sum of the diameters of the balls when the latter are held in contact with each other.

The end balls may be held in place in any suitable manner as for instance by caps of the character shown in Fig. 7. Where only a slight alteration is desired, it is often not necessary to employ a sleeve or other means for centering a smaller ball within the main holder and in some cases the effect of any lateral movement or play of the small balls within the tube or holder is so slight that it influences the exactness of the instrument by an extremely small fraction of the amount of the lateral play and may be ignored.

In Fig. 11, I have shown an instrument for measuring and checking parallel surfaces and of a character commonly called a parallel end gage. It consists of a large central ball —a'— which fits exactly within a tube —m— and upon opposite sides of this large ball are smaller balls —a'— which are caused to contact with the larger ball —a'— and the inner wall of the tube by suitable holding or retaining means. For obtaining perfectly plane end surfaces, the smaller balls are covered by plates —x— constituting such holding device.

In Fig. 12, I have shown an improved ring gage for measuring wires and the like. It consists of three balls or portions of balls —a— contacting one with another and held together by means of an annular holder —y—. The intermediate space —z—between the balls serves as the gaging hole.

Having thus described my invention, what I claim as new and desire to secure by Letters Patent is:

1. In a gage, the combination of a tubular holder, a tube shorter than said holder mounted therein, one or more spheres in said tube, and one or more spheres in said holder, said spheres being tangential to one another to form the determinative measuring parts.

2. In a gage the combination of a tubular holder, a tube shorter than said holder mounted therein, a plurality of spheres of varying diameters in said tube and one or more spheres in said holder, all said spheres being tangential to one another to form the determinative measuring parts.

3. A measuring instrument including a tubular holder, and a single row of spheres within said holder and contacting with each other, the two terminal spheres of said row projecting slightly beyond the ends of said holder and adapted to engage with opposed surfaces between which it is desired to gage the distance.

4. A measuring instrument including a holder and a plurality of spheres disposed therein and contacting with each other, portions of opposed surfaces of separate spheres being exposed and adapted to engage with the surfaces between which it is desired to gage the distance.

5. In a measuring instrument the combination of a holder and a plurality of spheres, a surface portion of one sphere being opposed to a surface portion of another sphere and other surface portions being exposed and adapted to engage with the surface to be gaged.

6. A measuring instrument including a holder having a passage therethrough and a row of spheres within said passage, the outer surfaces of the terminal spheres being exposed, the sum of the diameters of said spheres constituting the effective measuring length of said instrument.

In testimony whereof I have signed my name to this specification in the presence of two subscribing witnesses.

ROBERT CONRAD.

Witnesses:
  WOLDEMAR HAUPT,
  HENRY HASPER.

Copies of this patent may be obtained for five cents each, by addressing the "Commissioner of Patents, Washington, D. C."